United States Patent
Scheffer et al.

(10) Patent No.: US 7,721,237 B2
(45) Date of Patent: May 18, 2010

(54) METHOD, SYSTEM, AND COMPUTER PROGRAM PRODUCT FOR TIMING CLOSURE IN ELECTRONIC DESIGNS

(75) Inventors: Louis K. Scheffer, Campbell, CA (US); David White, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 3 days.

(21) Appl. No.: 11/866,376

(22) Filed: Oct. 2, 2007

(65) Prior Publication Data
US 2008/0163148 A1 Jul. 3, 2008

Related U.S. Application Data

(60) Provisional application No. 60/878,008, filed on Dec. 29, 2006.

(51) Int. Cl.
G06F 17/50 (2006.01)
G06F 9/45 (2006.01)
(52) U.S. Cl. .................... 716/6; 716/2; 716/5
(58) Field of Classification Search ............ 716/2, 716/5, 6
See application file for complete search history.

(56) References Cited

U.S. PATENT DOCUMENTS

| | | | |
|---|---|---|---|
| 7,124,386 B2 | 10/2006 | Smith et al. | |
| 7,152,215 B2 | 12/2006 | Smith et al. | |
| 7,174,520 B2 | 2/2007 | White et al. | |
| 7,243,316 B2 | 7/2007 | White et al. | |
| 7,325,206 B2 | 1/2008 | White et al. | |
| 7,353,475 B2 | 4/2008 | White et al. | |
| 7,356,783 B2 | 4/2008 | Smith et al. | |
| 7,360,179 B2 | 4/2008 | Smith et al. | |
| 7,363,099 B2 | 4/2008 | Smith et al. | |
| 7,363,598 B2 | 4/2008 | Smith et al. | |
| 7,367,008 B2 | 4/2008 | White et al. | |
| 7,380,220 B2 | 5/2008 | Smith et al. | |
| 7,383,521 B2 | 6/2008 | Smith et al. | |
| 7,392,496 B1 * | 6/2008 | Schultz et al. | 716/10 |
| 7,393,755 B2 | 7/2008 | Smith et al. | |
| 7,401,310 B1 * | 7/2008 | Thaden et al. | 716/6 |
| 7,448,014 B2 * | 11/2008 | Lavin et al. | 716/12 |
| 2003/0237064 A1 * | 12/2003 | White et al. | 716/5 |
| 2004/0243962 A1 * | 12/2004 | Subasic et al. | 716/10 |
| 2005/0037522 A1 | 2/2005 | Smith et al. | |
| 2005/0051809 A1 | 3/2005 | Smith et al. | |
| 2005/0132306 A1 * | 6/2005 | Smith et al. | 716/1 |

(Continued)

*Primary Examiner*—Jack Chiang
*Assistant Examiner*—Suresh Memula
(74) *Attorney, Agent, or Firm*—Vista IP Law Group LLP

(57) ABSTRACT

Disclosed is a method, system, and computer program product for timing closure with concurrent models for fabrication, metrology, lithography, and/or imaging processing analyses for electronic designs. Some embodiments of the present invention disclose a method for timing closure with concurrent process model analysis which comprises the act of generating a design for the one or more interconnect levels; analyzing the effects of the concurrent models to predict feature dimension variations based upon the concurrent models; modifying the design files to reflect the variations; determining one or more parameters based upon the concurrent models; and determining the impact of concurrent models upon the electrical and timing performance. Some embodiments disclose a computerized system for implementing the method(s) disclosed herein. Some embodiments also disclosed a computer program product comprising executable code for the method(s) disclosed herein.

25 Claims, 10 Drawing Sheets

U.S. PATENT DOCUMENTS

| | | |
|---|---|---|
| 2005/0196964 A1 | 9/2005 | Smith et al. |
| 2005/0235246 A1 | 10/2005 | Smith et al. |
| 2005/0251771 A1* | 11/2005 | Robles ........................ 716/5 |
| 2006/0026544 A1* | 2/2006 | Engel et al. .................... 716/6 |
| 2007/0089078 A1* | 4/2007 | Engel et al. .................... 716/6 |
| 2007/0101305 A1 | 5/2007 | Smith et al. |
| 2007/0256039 A1 | 11/2007 | White |
| 2008/0027698 A1 | 1/2008 | White |
| 2008/0160646 A1 | 7/2008 | White et al. |
| 2008/0162103 A1 | 7/2008 | White et al. |
| 2008/0163139 A1 | 7/2008 | Scheffer et al. |
| 2008/0163141 A1 | 7/2008 | Scheffer et al. |
| 2008/0163142 A1 | 7/2008 | White et al. |
| 2008/0163148 A1 | 7/2008 | Scheffer et al. |
| 2008/0163150 A1 | 7/2008 | White et al. |
| 2008/0216027 A1 | 9/2008 | White et al. |
| 2009/0031261 A1 | 1/2009 | Smith et al. |
| 2009/0031271 A1 | 1/2009 | White et al. |

* cited by examiner

702 Patterning process model(s)
- microlithography
- nanolithography
- photolithography
- electron beam lithography
- maskless lithography
- nanoimprint lithography
- interference lithography
- x-ray lithography
- extreme ultraviolet lithography
- scanning probe lithography
- plasma ashing

704 Removal process model(s)
- isotropic or anisotropic wet or dry etching
- chemical mechanical polishing
- reflow processes

706 Deposition process model(s)
- PVD
- CVD
- ALD
- ECD / Electroless
- MBE

710 Metrology process model(s)
- TEM
- SEM
- Transmission electron aberration-corrected microscopy
- Energy filtered TEM
- Optical measurement techniques

708 Imaging processing model(s)
- OPC
- SRAF
- PSM
- OAI

FIG. 7

METHOD, SYSTEM, AND COMPUTER PROGRAM PRODUCT FOR TIMING CLOSURE IN ELECTRONIC DESIGNS

CROSS-REFERENCE TO RELATED APPLICATION(S)

This application claims the benefit of U.S. Provisional Application No. 60/878,008, filed on Dec. 29, 2006, which is hereby incorporated by reference in its entirety.

BACKGROUND OF THE INVENTION

Timing closure has become increasingly difficult and presents some profound challenges in electronic circuit designs. The main goal of computer-aided design simulations is obtaining desired device electrical characteristics. Nonetheless, geometric dimensions and profiles of features of an electronic circuit design often have significant impact on the device electrical characteristics. The device dimensions which may have significant impact on the electrical characteristics include, for example, gate oxide thickness, gate width and length, shape of the poly gate at the bottom, and spacer width. As device geometry shrinks, semiconductor fabrication processes require more complex techniques to meet the design goals such as lower power supply, thinner gate oxides, shorter channel length, higher body doping concentration, and thinner silicon films. More importantly, the timing delay caused by the wires becomes more significant and can no longer be ignored.

As the device size continues to shrink and the clock frequency nevertheless increases, particularly into the deep-submicron regime, the electrical properties of wires or conductors become more prominent, and integrated circuit chips are more susceptible to breakdowns during fabrication due to, for example, the antenna effect or due to wear out or degradation over time due to, for example, electro-migration. Some prior methods propose prioritizing the nets and forcing shorter wire lengths among the high-priority, timing critical nets. However, making certain wires shorter usually comes at the expense of making other wires longer. Some other prior methods use larger gates with bigger transistors and higher drive strengths to charge the capacitance of wires more quickly and therefore making the path faster to maintain timing correctness without overly shortening some wires while lengthening others. However, there exists one problem for these methods. In electronic designs, the actual wire lengths are usually not known until some gates are physically in place occupying certain area(s) in the electronic circuit. Nonetheless, because larger gates also have larger capacitance and thus increases power and perhaps timing delay, the above method does not satisfactorily solve the problems caused by increasingly shrinking feature sizes. FIG. 1 illustrates a general method of timing closure, and FIG. 2 illustrates a method of timing closure with gate sizing.

Another problem with using larger gates is that larger gates with larger drive strength tend to worsen the problem of electro-migration. Deposited aluminum and copper interconnect have a polycrystalline structure from most fabrication processes; that is, these aluminum and copper interconnects are made of small grain lattices. Metal atoms can be transported between the grain boundaries. Electro-migration occurs during the momentum exchange between the mobile carriers and the atomic lattice as the current flow through the interconnect. As a result of the momentum exchange, metal tends to deposit in the direction of the electron flow, and voids thus form at the grain boundaries and reduce the conductivity. Such voids may over time cause the interconnect to stop conducting electricity altogether and thus cause the interconnect to fail.

Moreover, the continual effort to scale down electronic design features to the deep submicron region requires multi-level interconnection architecture to minimize the timing delay due to parasitic resistance and capacitance. As the devices shrinks to smaller sizes, the delay caused by the increased R-C time constant becomes more significant over the delay caused by the actual wire length. In order to reduce the R-C time constant, interconnect materials with lower resistivity and interlayer films with lower capacitance are required. However, the use of low-k dielectric material also aggravates the electro-migration problem due to the poor thermal conductivity of these low-k dielectric materials.

One way of resolving the aforementioned problems introduced by the continual reduction in feature sizes is to impose certain density rules for metal filling. Such rules typically comprise certain maximum and minimum densities within certain windows or areas on the chip. Some other rules impose different density limits among different window areas. Various tools and methods (see metal fill and slotting) have been developed or proposed for keeping the metal densities within the specified limits. However, the rules and equations used for estimating timing typically assume that the thickness of wires or conductors, at least for those on the same layer, is constant according to certain formulae, and therefore these rules and equations manipulate only the width of the wires to achieve the design goals.

Although this assumption of constant wire thickness arose out of a practical consideration and has worked while the thickness variation is relatively insignificant as compared to the geometry sizes, such an assumption appears to be outdated, especially in light of the current development in incorporating the topological variations of each film into the electronic designs and the continuously shrinkage in sizes of device features. Moreover, wire width cannot be arbitrarily altered due to the polycrystalline structure of the interconnect materials. As a result, additional methods have been developed to slot certain wires such that the metal densities within certain regions fall within the prescribed maximum and minimum limits.

Nonetheless, the above rule-based methods pose new problems and challenges in electronic designs. For instance, a good interconnect may be wrongfully determined to be improper for failing to meet the density rules or for producing unacceptable R-C delay even though the interconnect actually satisfies the design goals by having certain thickness that is different from the assumed value. A contrary example is that a bad interconnect unfit for the design intent or goals may nonetheless be wrongfully determined to be proper for meeting the metal density rules and/or the delay requirement. Furthermore, even among legal designs as bound by such limits, designers may nevertheless prefer different metal thicknesses in different parts of their designs. For example, a designer might prefer thin metal where minimum capacitance (C) is needed and thick metal where minimum resistivity or resistance (R) is required. A density limit, as typically specified now, does not tell how the thickness depends on density and does not express any relationship between density and thickness or the sign of such a relationship.

There are many existing approaches to timing closure. Typical timing closure approaches keep the gate delay constant under load by sizing the gates. The flaw in these approaches, as interconnects get longer, is that wire resistance can no longer be neglected as it usually is in these gate sizing approaches. Moreover, keeping the delay constant by sizing the gate offers reasonably accurate approximations only when there is no or insignificantly low resistance between the driving gate and the capacitive load. This is no longer true as the geometry continually shrinks, especially into the deep submicron technologies. Another approach by employing timing-driven placement methods may also be ineffective because these methods rely only on and are thus limited by the quality of the placement and the accuracy of the timing model. Furthermore, one common limitation of all these approaches is that these approaches only change the placement and/or the nominal, center-line routing.

With the advent of deep submicron technologies, resolution enhancement techniques (RET) have become one of the most important techniques to guarantee design for manufacturability (DFM). Nonetheless, applying these resolution enhancement techniques without taking the surface topology of certain features of the electronic design into consideration may pose further challenges to timing closure due to the continual pursuit for smaller geometry sizes and the use of shorter wavelengths on the lithographic tools such as the 193 nm $\lambda$ ultra-high NA (numerical aperture) lithography or even the Extreme Ultra Violet lithography, especially in the deep submicron and increasing clock frequency designs. For example, in order to meet the increasing demand for higher resolution and finer geometries, the semiconductor industry has been pushing in order to obtain larger numerical aperture (NA) to achieve smaller minimum feature size. However, larger NA also decreases the depth of focus, and such decreased depth of focus causes the lithographic tools' ability to print accurate circuits to be more sensitive to the topographical variation of the films on the wafer.

SUMMARY OF THE INVENTION

As such, there exists a need for a more effective and accurate methodology for timing closure problems, especially in the deep submicron and increasing clock frequency designs. The present invention is directed to an improved method, system, and computer program product for performing timing closure for electronic designs. According to some embodiments of the present invention, the user may incorporate models for imaging processing techniques (such as RET), fabrication processes, or metrology processes to accurately predict the probability distribution of the performance of the electronic design in question.

DESCRIPTION OF FIGURES

The drawings illustrate the design and utility of preferred embodiments of the present invention. It should be noted that the figures are not drawn to scale and that elements of similar structures or functions are represented by like reference numerals throughout the figures. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 7 illustrates various concurrent models incorporated in several embodiments of an electronic circuit design tool with concurrent model analysis.

DETAILED DESCRIPTION

Figure 1:
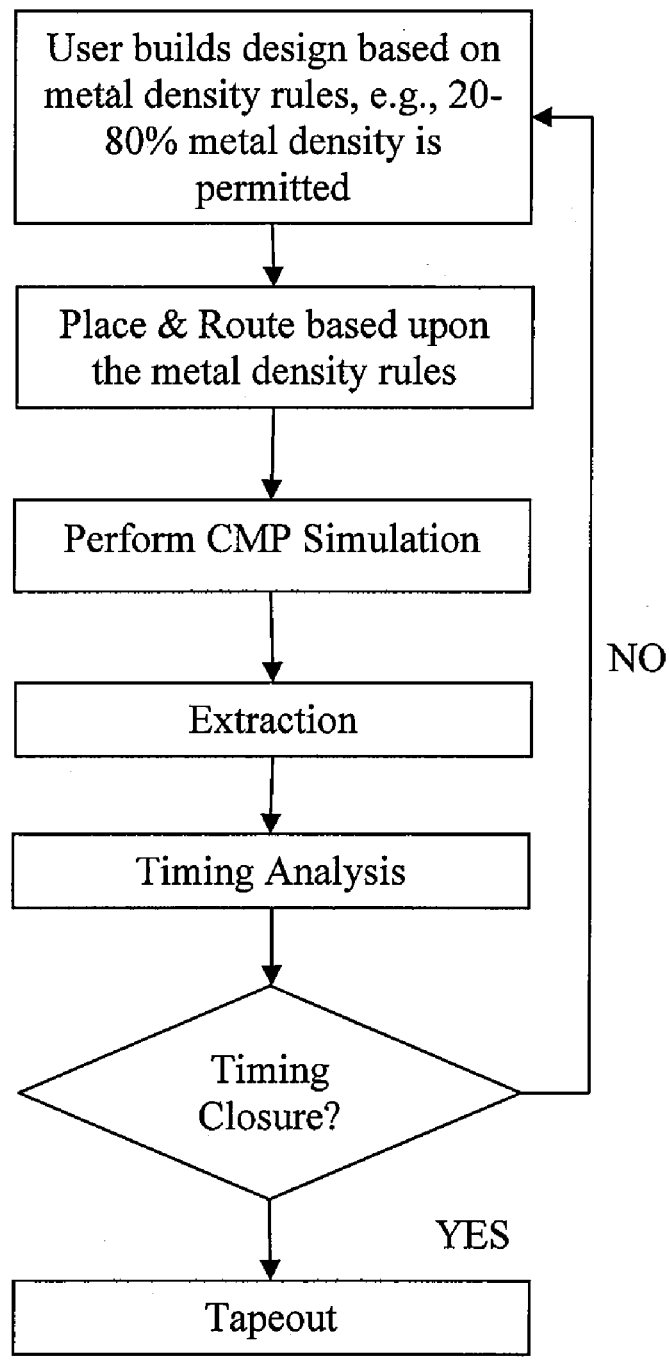
FIG. 1 illustrates a method for performing timing closure for electronic circuit designs.
Figure 2:
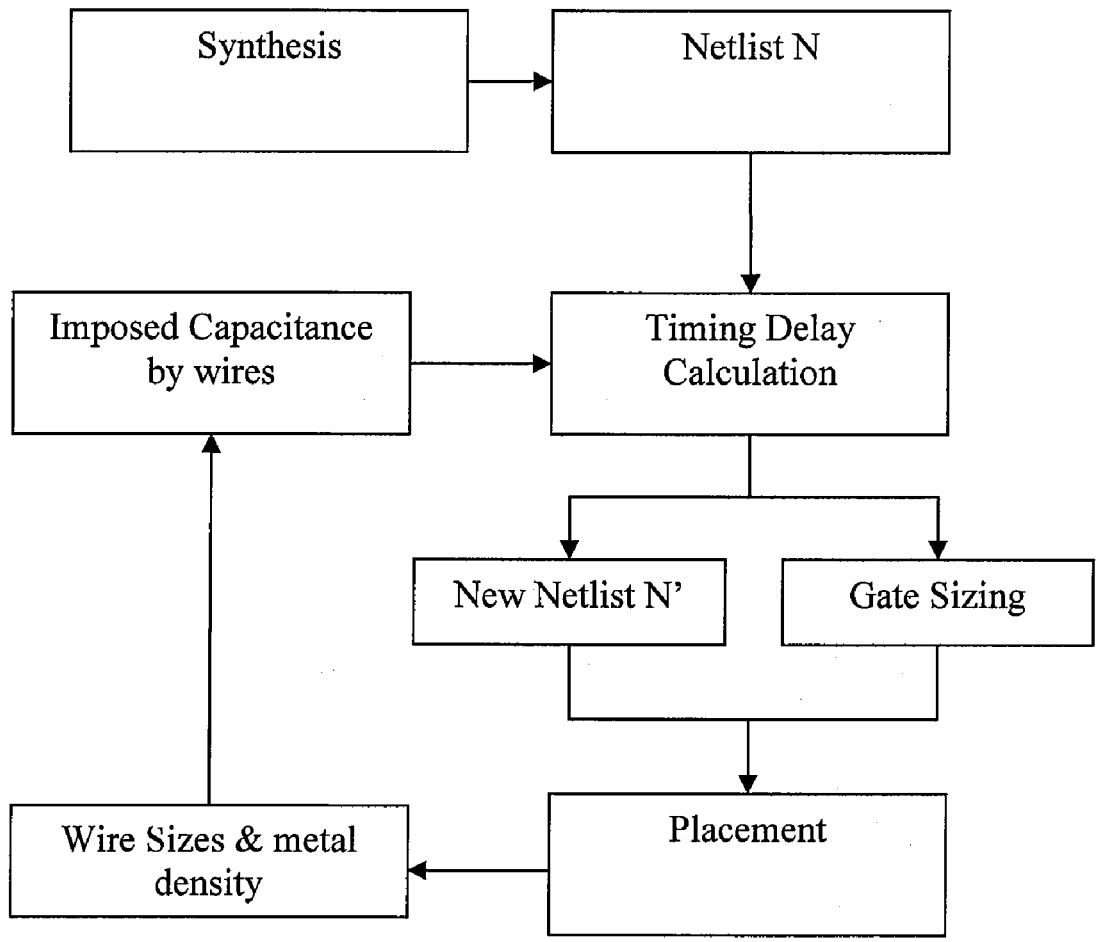
FIG. 2 illustrates a method which employs gate sizing and manipulation of wire sizes for timing closure.

The present invention is directed to an improved method, system, and computer program product for an electronic design tool with concurrent models for fabrication, lithography, metrology, and/or imaging processing processes or techniques such as the resolution enhancement techniques (RET). Some embodiments of the present invention utilize the above method, system, and/or computer program to produce more effective and accurate performing timing closure for electronic design. As noted above, conventional methods and systems neglects the impact of variation of surface topology on the silicon and thus either use unnecessary computation resources to produce the results or even to produce unsatisfactory results. The proposed methodologies may be applied at least to the fields of placement, routing, trial route, global route, detailed route, and floorplanning.

Various embodiments of the invention may be implemented in numerous ways, including as software, hardware (e.g., an electronic circuitry), a process, an apparatus, a system, a method, or as a set of instructions on a computer readable medium such as a computer readable storage medium or one or more storage devices on a computer network wherein program instructions are sent over optical or electronic communication links. In general, the actions of disclosed processes may be performed in an arbitrary order, unless otherwise provided in the claims.

A detailed description of one or more examples is provided below along with accompanying figures. The detailed description is provided in connection with such examples, but is not limited to any such particular examples. Numerous specific details are set forth in the following description in order to provide a thorough understanding of various embodiments of the subject matters of the invention. These specific details are provided for illustrative purposes and the described techniques may be practiced according to the claims without some or all of these specific details. For example, some embodiments described below utilize metal layers for illustrative purposes and thus do not intend to limit the application of the present invention to metal layers and should not be limited as such. For the purpose of clarity, technical material that is known in the technical fields related to the examples has not been described in detail to avoid unnecessarily obscuring the description.

According to some embodiments of the invention, the electronic circuit designer uses one or more concurrent models for fabrication, lithography, metrology, and/or imaging processing processes or techniques to bias the design and to predict the most accurate performance of the circuit. The designer need not work with, for example, some metal density rules which bound the design to an upper and a lower limit. Rather, the designer uses the methods described below together with extraction and timing analysis which take into account the predicted feature characteristics. The designer may then "bias" the design in the right direction according to the predictions to meet different objectives.

For instance, as in the case of a performance critical circuit, the designer may opt for the higher end of the density range in one area of the electronic circuit design and choose narrower line spacings while meeting one or more timing objectives. As another example, as in the case of a non-performance critical circuit, the designer may opt for the lower end of the metal density in another area of the electronic circuit design and choose wider wire spacing and/or thicker interconnects or oxides to improve yield while meeting one or more timing objectives. Note that these changes may interact with each other and may need to be considered jointly—for example, spacing wires farther apart causes less capacitance due to the increased spacing, the only effect considered by today's tools. But it will also change the optical properties, and perhaps the RET, and so will change the as-built width even though the nominal width is the same. Also, by changing the local density, it will change the thickness, and perhaps the cross section of the section of the wire. Finally, some of the thickness changes may propagate to the next level, causing changes due to varying focus. Accurate estimates of timing may require all these effects to be considered together.

Figure 3:
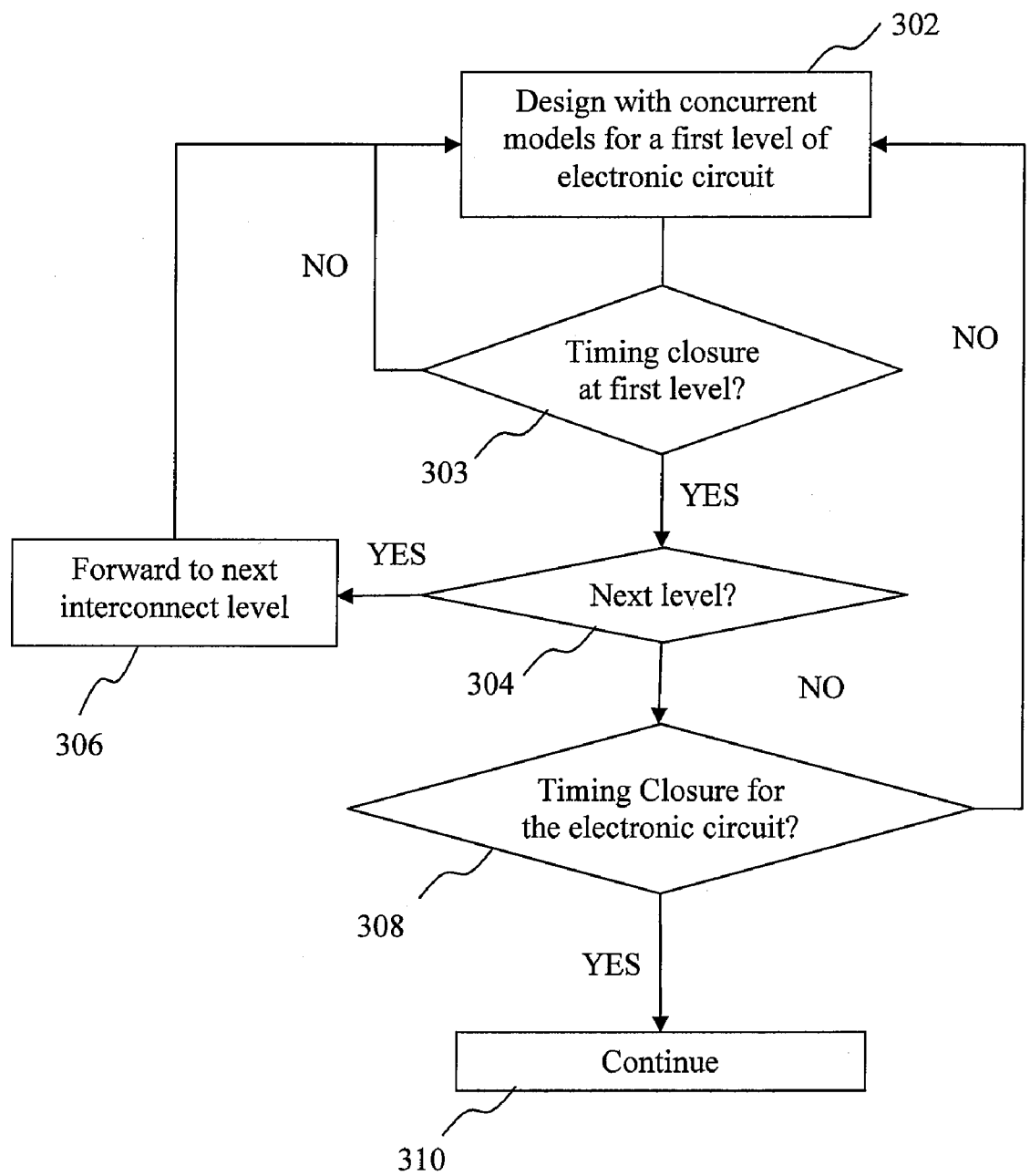
FIG. 3 illustrates an embodiment of a method for performing timing closure for an electronic circuit design with concurrent model analysis.

FIG. 3 depicts a high level flow chart of a method for performing timing closure for electronic design with concurrent model analysis. At 302 in some embodiments of the present invention, the method or the system utilizes a design tool with one or more concurrent models of a fabrication, metrology, lithography, and/or imaging processing process or technique to analyze the first level of an electronic design to be manufactured by the fabrication, metrology, lithography, and/or imaging processing process or technique upon which the concurrent model is determined. At 303, the method or the system of some embodiments of the present invention performs timing closure for the first level of the electronic circuit. In various embodiments of the present invention, the timing closure analysis performed at 303 may take the concurrent model(s) or the analysis results of such concurrent models into consideration. Various techniques for timing closure may be employed at 303 and are well known to one skilled in the art and thus will not be described in details here. Where the timing closure is not properly concluded at 302, the method or the system of some other embodiments of the present invention loops back to 302. Further details of the timing closure not being properly concluded are described in more details in the following sections. For timing closure in some electronic circuit designs, it may be desirable to eliminate violations and prevent such violations from propagating to the next level.

At 304, the method or the system of some embodiments of the present invention determines whether there is an additional level in the electronic circuit design to be analyzed or designed. A level in the electronic circuit design may comprise the design for an interconnect level, a metal layer, or a mask level of the electronic circuit. Where the method or the system of some embodiments determines that there is an additional level to be analyzed or designed, the method or the system proceeds to 306 and forwards the design or the concurrent model(s) of the current level to the additional level of electronic circuit design. In some other embodiments of the invention, the method or the system may perform some timing analysis or timing closure after 302 regardless of whether there is an additional level of electronic circuit design to be analyzed or designed. In these embodiments, the method or the system may fix some or all of the timing violations to the extent possible and prevent these timing violations on the current level from propagating to the next levels.

Where the method or the system of some embodiments of the invention determines at 304 that there is no additional level to be analyzed or designed, the method or the system then proceeds to 308 and performs timing closure for the electronic circuit including all the levels identified. In various embodiments of the present invention, the timing closure analysis performed at 308 may take the concurrent model(s) or the analysis results of such concurrent models into consideration. Various techniques for timing closure may be employed at 308 and are well known to one skilled in the art and thus will not be described in details here. Where the timing closure is not properly concluded at 308, the method or the system of some other embodiments of the present invention loops back to 302. Further details of the timing closure not being properly concluded are described in more details in the following sections.

For example, in some embodiments of the present invention, the method or the system may forward the first interconnect level design data or information to the second interconnect level to determine, together with the concurrent model(s), the impact of the first interconnect level on the second interconnect level. In some embodiments of the present invention, the method or the system may, based upon the first interconnect level design data or information, determine various characteristics of the second interconnect level or to predict various attributes or characteristics of the second interconnect level. In some embodiments, the method or the system may determine the geometric dimensions and profiles of various features on the second interconnect level (for example, the thickness of a dielectric layer, resistivity of a wire, or capacitance of a circuitry on the second interconnect level) based upon the topological information of the features or components or characteristics of features or components on the first interconnect level (for example, the flatness or topological profile of the first interconnect layer.)

Referring back to FIG. 3. If, on the other hand, it is determined there is no further level to analyze, the method or the system of some embodiments of the present invention may continue to the next action at 310. For example, the designer may generate the Graphical Data System II (GDS II) file, or the equivalent, for tapeout or may perform further verification before final tapeout. However, if the analysis (for wiring closure, timing closure, design closure, or other analyses) does not converge the design process goes back to 302 and repeats the above actions until wiring closure, timing closure, design closure, or other design objective is properly concluded.

In various embodiments of the present invention, the concurrent models comprise models for processes or techniques in integrated circuit fabrication, metrology, and image processing. Such integrated circuit fabrication processes or techniques may comprise, for example but not limited to, deposition processes such as physical vapor deposition (PVD), chemical vapor deposition (CVD), atomic layer deposition (ALD), electrochemical deposition or electro-plating (ECD), electroless plating or deposition, auto-catalytic plating or deposition, and molecular beam epitaxy (MBE), removal processes such as isotropic or anisotropic wet or dry etching, chemical mechanical polishing (CMP), or reflow processes, patterning processes such as lithography, modification of properties such as ion implantation, annealing, oxidation, UVP (ultraviolet light processing). More specifically, lithography processes or techniques comprise microlithography, nanolithography, photolithography, electron beam lithography, maskless lithography, nanoimprint lithography, interference lithography, x-ray lithography, extreme ultraviolet lithography, or scanning probe lithography, or the plasma ashing processes. Yet in some embodiments of the present invention, the concurrent models may also comprise models for the metrology processes or techniques. Metrology processes or techniques comprise transmission electron microscopy (TEM), scanning electron microscopy (SEM), transmission electron aberration-corrected microscopy, energy filtered TEM, or optical measurement techniques. Moreover, the image processing techniques or processes comprise, for example but not limited to, various resolution enhancement techniques such as ruled-based or model-based Optical Proximity Correction (OPC), Subresolution Assist Features (SRAF), Phase Shifting-Mask (PSM), and Off-Axis Illumination (OAI).

The concurrent models may be determined by directly simulating the processes or techniques of interest. For example, the concurrent model may directly simulate the metrology measurement process to predict or estimate the measurement results. As another example, in some embodiments of the present invention, a concurrent model may be determined by directly simulating, for example, the physical, electromagnetic, thermal, or chemical aspects of the processes or techniques or the interactions thereof.

Furthermore, in some embodiments, the concurrent models may be model-based or rule-based. For example, a rule-based concurrent fabrication model may require that the metal density to be no more than a first upper threshold and/or no less than a first lower threshold. Furthermore, in some embodiments of the present invention, whether or not the concurrent models are direct simulation based, model based, or rule based, such concurrent models may be calibrated with information obtained from one or more test patterned wafers or from other sources of limited fidelity such as a simple analytic model, empirical formulae or models, formulae or models with interpolation or extrapolation of information or data, or other approximations. In other embodiments of the present invention, one may determine the concurrent models with the information obtained from one or more test patterned wafers or from other sources of limited fidelity such as a simple analytic model, empirical formulae or models, formulae or models with interpolation or extrapolation of information or data, or other approximations. Yet in some other embodiments of the present invention, one or more of the concurrent models may be determined with information obtained from a set of one or more patterned test wafers or from other sources of limited fidelity such as a simple analytic model, empirical formulae or models, formulae or models with interpolation or extrapolation of information or data, or other approximations and then calibrated with information obtained from the same or different set of one or more patterned test wafers or from other sources of limited fidelity such as a simple analytic model, empirical formulae or models, formulae or models with interpolation or extrapolation of information or data, or other approximations.

In some embodiments of the present invention, the method or the system may change the electronic circuit design to determine whether the objectives are fulfilled. In some other embodiments of the present invention, the method or the system may recommend one or more changes in the electronic circuit design to the user or designer who may in turn determine whether or not to accept the recommended changes. Where the user or designer determines not to accept the recommended changes, the method or the system may, in some embodiments of the present invention, recommend other changes in the electronic circuit design to the user or designer. In some other embodiments of the present invention, the method or the system may recommend other changes in the electronic circuit design based upon one or more criteria specified by the user. Such one or more criteria may comprise, for example, design intent, design objectives, or some explicitly specified upper or lower bounds of some characteristics or attributes of a feature or component of the electronic circuit design. In some other embodiments of the present invention, the user or designer may override some or all of the changes recommended by the method or the system.

Some other embodiments may be applied where only a portion of the final complete layout, for example one or more blocks or cells, is available. A context simulation method may be used to introduce likely geometric environments into the incomplete regions, for example structures with similar densities or line widths, or an environment with a geometric distribution based on prior designs. For processes with large pattern interaction ranges such as CMP, simulation of layout portions not available may be useful. More details about context simulation is described in U.S. patent application Ser. No. 11/768,851, entitled "METHOD AND SYSTEM FOR IMPLEMENTING CONTEXT SIMULATION" filed on Jun. 26, 2007, which is incorporated herein by reference in its entirety.

Figure 4:
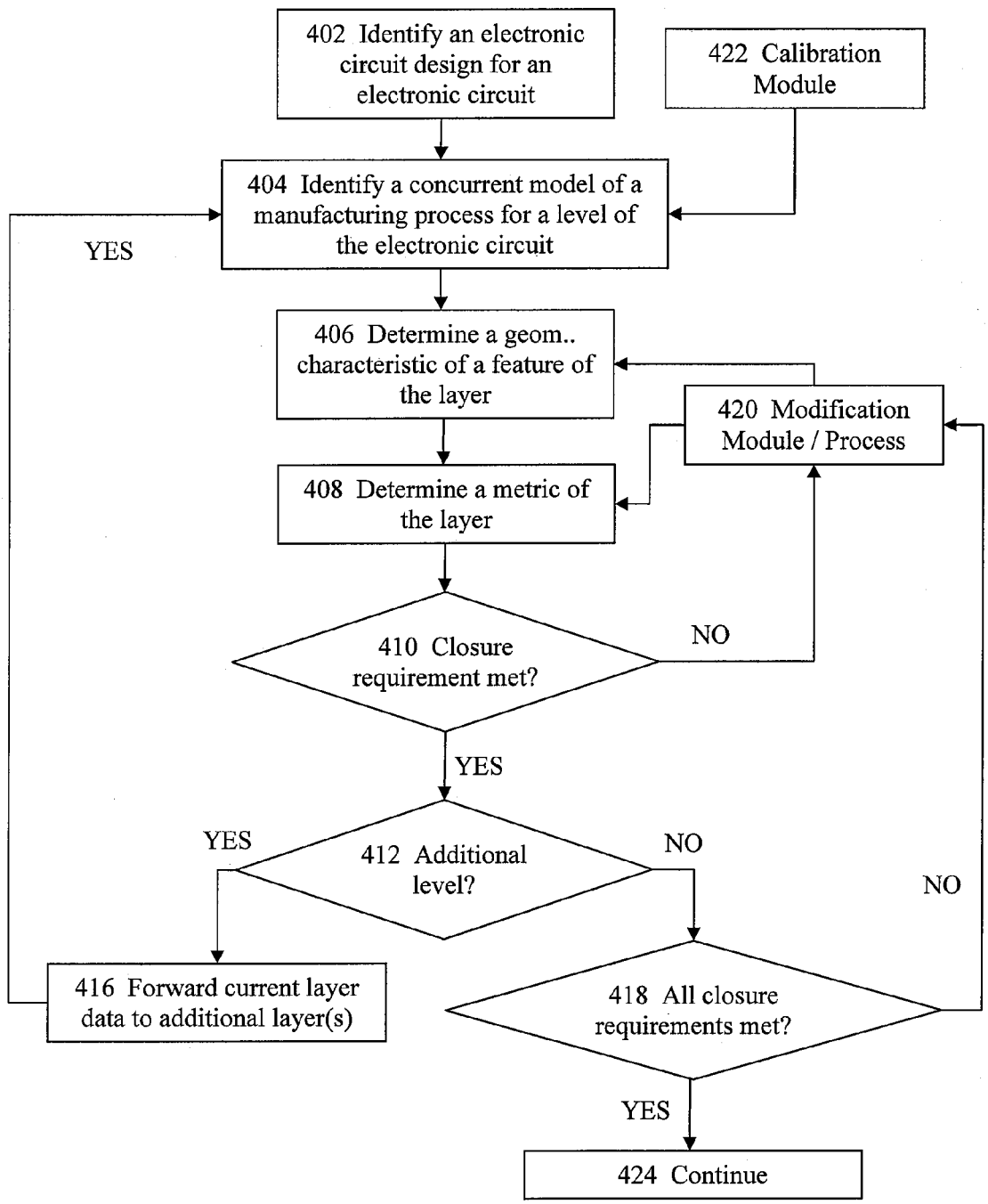
FIG. 4 illustrates an embodiment of method for designing an electronic circuit design with concurrent model analysis.

FIG. 4 further illustrates some embodiments of present invention in more details. At 402, the method or the system of some embodiments of the present invention identifies an electronic circuit design for an electronic circuit. At 404, the method or the system of some embodiments of the present invention identifies a first concurrent model of a first manufacturing process for a first layer of the electronic circuit where the first layer is to be manufactured by the first manufacturing process. The first manufacturing process may comprise, for example but shall not be limited to, fabrication processes, metrology processes or techniques, or imaging processing processes or techniques. Moreover, the first concurrent model may optionally be constructed or calibrated in conjunction with the calibration module 422. For example, the first concurrent model may be determined or calibrated with a calibration module which comprises information or data obtained from a patterned test wafer which includes identical or similar features manufactured by a plurality of fabrication, metrology, or image processing processes or techniques upon which the first concurrent model is determined; the first concurrent model may also be determined or calibrated from other less accurate but easier or less expensive models with limited fidelity such as a simple analytic model, empirical formulae or models, formulae or models with interpolation or extrapolation of information or data, or other approximations.

Generally, the fabrication process comprises deposition processes, removal processes, patterning processes, or property modification processes or techniques. More specifically, the deposition processes may comprise, for example but shall not be limited to, physical vapor deposition (PVD), chemical vapor deposition (CVD), atomic layer deposition (ALD), electrochemical deposition or electroplating (ECD), electroless plating or deposition, auto-catalytic plating or deposition, and molecular beam epitaxy (MBE).

The removal processes may comprise, for example but shall not be limited to, isotropic or anisotropic wet or dry etching, chemical mechanical polishing (CMP), or reflow processes.

The patterning processes may comprise, for example but shall not be limited to, lithography processes or techniques such as lithography processes or techniques comprise microlithography, nanolithography, photolithography, electron beam lithography, maskless lithography, nanoimprint lithography, interference lithography, x-ray lithography, extreme ultraviolet lithography, or scanning probe lithography, or the plasma ashing processes.

The property modification processes or techniques may comprise, for example but shall not be limited to, ion implantation, annealing, oxidation, UVP (ultraviolet light processing).

The imaging processing techniques or processes may comprise, for example but shall not be limited to, various resolution enhancement techniques such as ruled-based or model-based Optical Proximity Correction (OPC), Subresolution Assist Features (SRAF), Phase Shifting-Mask (PSM), and Off-Axis Illumination (OAM).

Referring back to FIG. 4. Once concurrent model is identified for a first layer in the electronic circuit, the method or the system of some embodiments of the present invention determines a first geometric characteristic of a first feature of the first layer of the electronic circuit at 406. Such first geometric characteristic may comprise geometric dimensions of a feature such as but shall not be limited to depth, width, thickness, diameter, uniformity, or profile of a feature, implantation depth, angle of a sidewall, etc. Such first geometric characteristic may also comprise variation of a feature dimension from its nominal value. The first feature may comprise a component, part of a component, or a series of components of the circuitry on the first layer, a deposited or otherwise processed (e.g., etched or polished) film in the first layer, identical or similar features across the wafer, or identical or similar features from one wafer to another wafer. Moreover, the first layer may comprise a metal layer, an interconnect layer, or simply a single step in the fabrication processes.

At 408, the method or the system of some embodiments of the present invention determines a first metric of the first layer of the electronic circuit. In some embodiments, the determination of the first metric is based in part upon the first geometric characteristic of the first feature of the electronic circuit. The first metric may comprise, for example but shall not be limited to, circuit performance, signal integrity, coupling noise, power integrity, reliability, or yield. At 410, the method or the system of some embodiments of the present invention optionally determines whether one or more closure requirements are satisfied for the current level. Where the method or the system of some embodiments of the present invention determines that the closure requirements have been satisfied, the method or the system may move forward to 412 for further actions as described below. Optionally performing, at 410, a closure requirement check at the current level and before the analysis of the next level, if any, may prevent some or all violations from propagating to the next level(s) of the electronic circuit and rendering the violations more difficult to fix at the next level(s).

Where the method or the system of some embodiments of the present invention determines that the closure requirements have not been satisfied, the method or the system may employ various acts from the modification module 420. The modification module 420 will be described in further details in subsequent sections. In some embodiments of the present invention, the method or the system may modify the design and goes back to 406 to re-evaluate the modified design. In some other embodiments of the present invention, the method or the system may, based upon the changes made to the design, go back to 408 to directly re-determine the metric of the first layer and determine whether the timing closure requirement is satisfied with the changes at 410. Yet in some other embodiments of the present invention, the method or the system may recommend changes to be made to the design to the designer based upon, for example, the design intent or the design objectives, and the designer may decide whether or not the recommended changes shall be implemented. Yet in some other embodiments, the method or the system of the present invention, the designer may be given the choice to override the recommended changes and input new changes.

For example, the method or the system in some embodiments of the present invention may identify one or more concurrent models for a fabrication, metrology, or image processing techniques for the manufacturing of a first layer of an electronic circuit and more accurately determine the geometric characteristics such as profiles or geometric dimensions of one or more features on the first layer. The method or the system of some embodiments of the present invention may then, based upon the geometric characteristics, to more accurately determine one or more electrical characteristics such as resistance, capacitance, or inductance of a wire of a feature on the first layer of the electronic circuit. Once such one or more electrical characteristics of one or more features on the first layer are determined, the method or the system of some embodiments of the present invention may then determine some metrics of the first layer of the electronic circuit for the purpose of timing closure.

For example, the method or the system of some embodiments of the present invention may determine the signal integrity by evaluating the interaction between two or more features on the first layer. If more than one layer is used, the interacting features may be on different layers, as well. More specifically, the method or the system of some embodiments of the present invention may analyze the induced current, which may be governed by the equation $$\Delta I = C \frac{dV}{dt},$$

where C denotes the mutual capacitance between the two features. As another example, the method or the system of some embodiments of the present invention may further evaluate the power integrity by examining the power integrity governed by $$\Delta V = I \cdot R + L \cdot \frac{dI}{dt},$$

where $\Delta V$ denotes the voltage fluctuations.

Yet as another example, as the method or the system may more accurately determine the geometric characteristics of one or more features in the electronic circuit, resistance of a wire is no longer neglected or is no longer considered linear to the length of the wire, the method or the system of the present invention in some embodiments may more accurately perform the static timing analysis or the statistical static timing analysis with the aid of the profiles and routes of the wires and the concurrent models.

At 412, the method or the system of some embodiments of the present invention optionally determines whether there exists an additional layer to analyze. In some embodiments of the present invention where it is determined that there exists one or more additional layers in the electronic circuit, the method or the system of the present invention forwards the data or information of the current layer to the one or more additional layers at 416 and goes back to 404 to repeat the acts of 404-412. In some embodiments, the method or the system may forward the geometric characteristics of the current layer previously determined to the one or more additional layers or levels. In other embodiments, the method or the system may forward the metrics to the one or more additional layers.

Where the method or the system of some embodiments of the present invention determines that there is no additional layer to analyze at 412, the method or the system of some embodiments of the present invention then continues to 418. At 418, the method or the system of various embodiments of the invention determines whether the electronic circuit meets all the closure requirement. The closure requirement may comprise, for example but shall not be limited to, timing closure, design closure, wiring closure, or other design objectives or constraints. Where the method or the system of some embodiments determines that the closure requirement is satisfied at 418, the method or the system proceeds to 424. For example, in some embodiments where the timing closure is properly concluded and where it is determined that there exists no additional layers to be analyzed in the electronic circuit, the designer may, at 420, generate the Graphical Data System II (GDS II) file(s), or the equivalent, for tapeout or may perform further verification before final tapeout.

Where the method or the system determines that some of the closure requirements are satisfied and cannot be relaxed, the method or the system of some embodiments of the invention proceeds to 420 to invoke the modification module or process. The modification process or module may, in some embodiments, modify the electronic circuit design. In some other embodiments, the modification module may, based upon the concurrent model(s), modify the parameters of the process(es) or technique(s) upon which the concurrent model(s) is (are) determined. Then the method or the system of some embodiments of the invention proceeds to 406 to re-determine the geometric characteristic of a electronic design feature which may have contributed to the electronic circuit design's failure to meet the closure requirement. The method or the system of some other embodiments of the invention may also proceed directly from 420 to 408 to re-determine the first metric of the first layer of the electronic circuit where the first metric is related to the failure of the electronic circuit design to meet the closure requirement.

Figure 5:
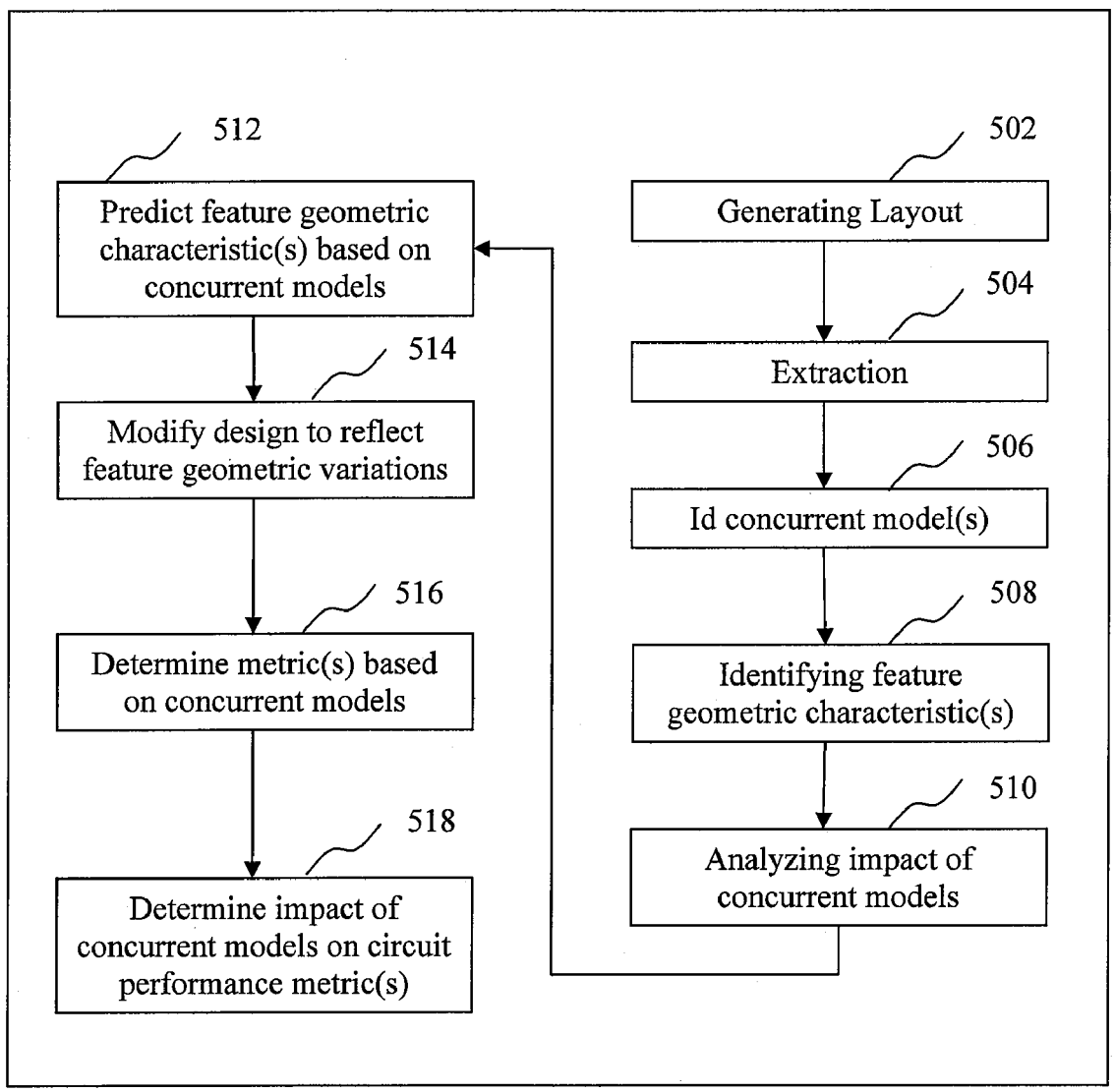
FIG. 5 illustrates an embodiment of an electronic circuit design tool with the aid of concurrent models for fabrication, metrological, lithographic, or imaging processing processes of techniques.

FIG. 5 further illustrates one embodiment of the electronic circuit design tool with concurrent models for fabrication, metrological, lithographic, or imaging processing (such as resolution enhancement techniques—RETs) analysis.

At 502, the design tool or user generates a circuit design layout based upon, for example, the designer's intent and specification. At 504, the design tool performs extraction of the design layout. The design tool then identifies one or more models for fabrication, metrology, and/or image processing techniques at 506. The method or the system further identifies the information of topographical variations of the film on the wafer due to different processes and/or design features at 508. At 510, the method or the system then determines the effects or impacts upon the design of the fabrication, metrology, or image processing upon which the concurrent models are determined. In some embodiments, the method or the system determines such effects or impacts by analyzing or simulating the concurrent model. At 512, the method or the system of some embodiments of the present invention predicts the variations or the values of the design feature dimensions or attributes based on one or more concurrent models for fabrication, metrological, lithographic, and/or imaging processing.

Based upon the predicted values or the predicted variations or departures from the feature dimensions and/or attributes as designed, the method or the system of some embodiments of the present invention may then modify the design file such as a GDS II or OASIS file to reflect the variations of the design feature dimensions and/or characteristics at 514. Such design feature characteristics may include, but not limited to, geometric profiles and/or shapes of a feature of the electronic design. At 516, the method or the system of some embodiments of the present invention further determines one or more electrical, physical, chemical, or thermal parameters or characteristics of a feature of the electronic circuit based upon one or more concurrent models for fabrication, metrological, and/or imaging processing. Such electrical parameters may include, but not limited to, electrical resistance, bulk resistivity, capacitance, inductance, propagation delay, R-C time constant, current densities, power consumption, or IR drop.

Such physical parameters or characteristics may comprise, but not limited to, feature dimensions, feature profiles, uniformity of similar identical or feature characteristics within the same die, uniformity of similar identical or characteristics across the wafer, or uniformity of identical or similar feature characteristics from one wafer to another wafer. Some or all of the feature dimensions and profiles may take the form of distributions or statistical descriptions, for example mean, range or standard deviation, rather than discrete values for a given feature in various embodiments of the invention. This may be useful when pattern or layout dependent variability predictions are to be combined with tool, wafer level, or random manufacturing variations.

Such chemical parameters or characteristics may comprise, but not limited to, chemical composition of a feature of the electronic circuit, bulk density of a species in a feature of the electronic circuit, or distribution of a species within a feature of the electronic circuit. Such thermal parameters may comprise, for example but not limited to, thermal conductivity or thermal expansion coefficient due to different composition of matters in the electronic design features. The method or the system of some embodiments of the present invention may also determine other parameters due to the introduction of imaging processing techniques such as RETs. Such parameters may include, but not limited to, amplitude, phase, direction of propagation, polarization of the light, or numerical aperture (NA). The method or the system of some embodiments of the present invention then determines the impact of the concurrent models for fabrication, metrology, lithography, and/or imaging processing techniques such as RETs on the electrical performance by performing, for example, electrical power consumption analysis and timing analysis by performing such as static timing analysis (STA) or statistical static statistical static timing analysis (SSTA).

Figure 6:
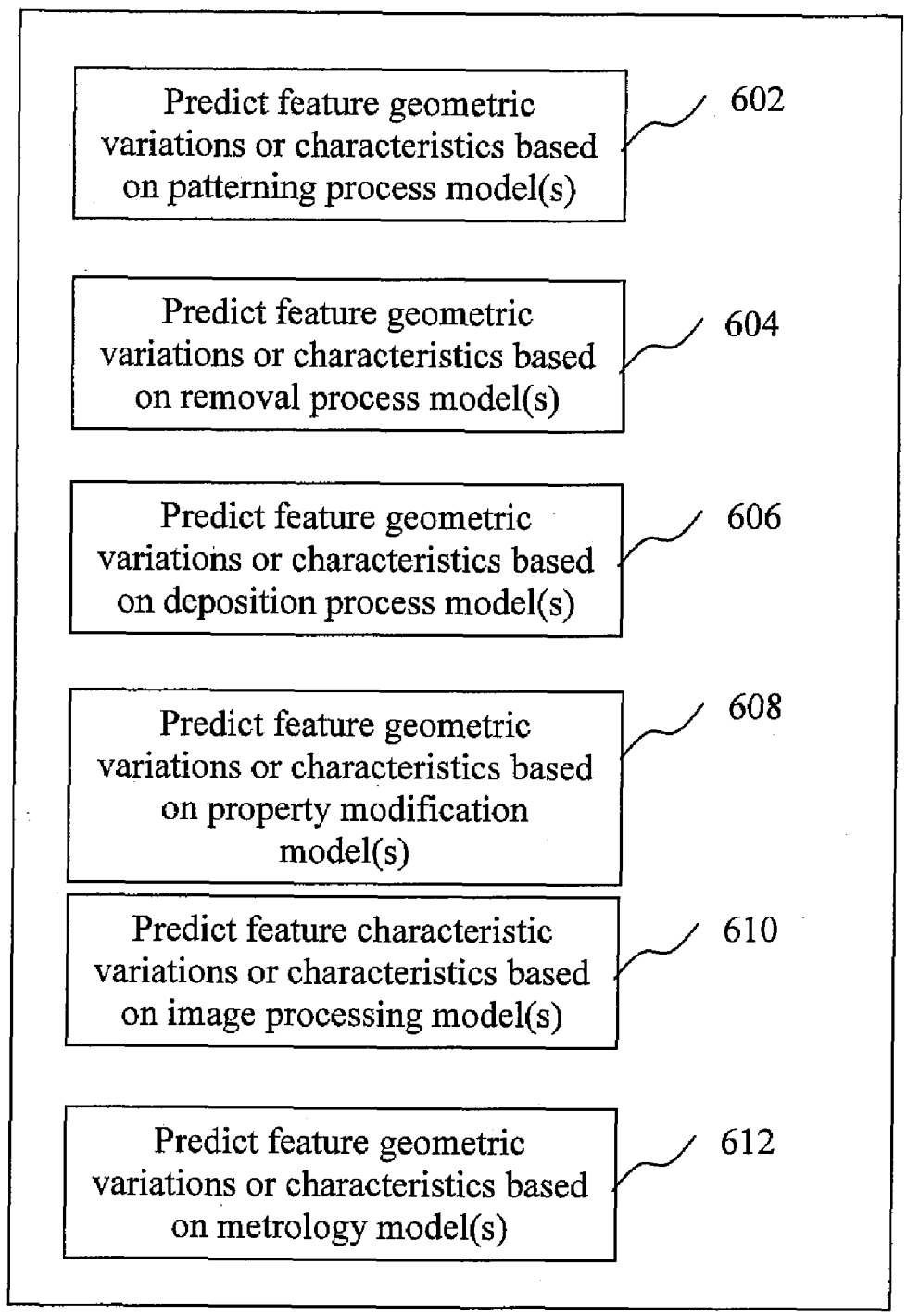
FIG. 6 illustrates several embodiments of an electronic circuit design predicting tool for an electronic circuit design tool with concurrent model analysis.

FIG. 6 illustrates an embodiment of the predicting module of the design tool with one or more concurrent models for fabrication, metrology, and/or image processing processes or techniques. The predicting module may include, but not limited to, a sub-module to predict feature dimension variations or characteristics due to patterning process models, 602, due to removal process models, 604, due to deposition process models, 606, due to property modification models, 608, due to one or more models for image processing techniques or processes such as RETs, 610, or due to one or more metrology models 612.

FIG. 7 illustrates some examples of the concurrent models for the fabrication, metrology, or image processing processes or techniques. 702 lists some examples of the patterning process models such as but shall not be limited to microlithography, nanolithography, photolithography, electron beam lithography, maskless lithography, nanoimprint lithography, interference lithography, x-ray lithography, extreme ultraviolet lithography, scanning probe lithography, and plasma ashing. 704 lists some examples of the removal process models such as but shall not be limited to isotropic or anisotropic wet or dry etching, chemical mechanical polishing, or reflow process models. 706 lists some examples of the deposition process models such as but shall not be limited to PVD, CVD, ALD, ECD, or MBE. 708 lists some examples of the image processing process models such as but shall not be limited to OPC, SRAF, PSM, and OAI. 710 lists some examples of the pattern process models such as but shall not be limited to TEM, SEM, transmission electron aberration-corrected microscopy, energy filtered TEM, optical measurement techniques.

Figure 8:
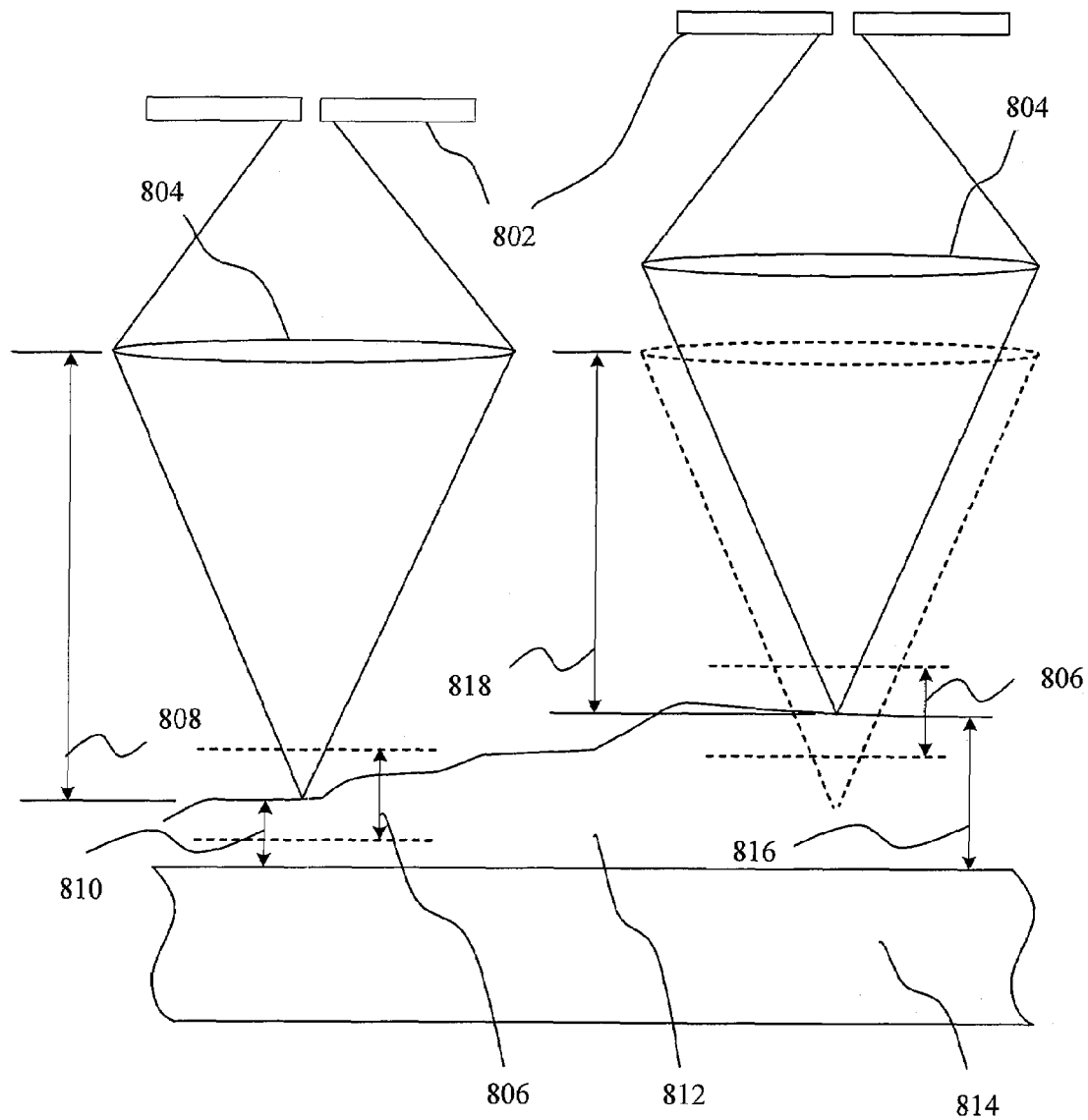
FIG. 8 illustrates an example showing the impact of thickness or topological variation of a film on the lithography process.

FIG. 8 illustrates an example of an impact of thickness variation of the film on the lithography process. A simplified lithographic apparatus with a depth of focus, 806, comprises the mask, 802, and a reduction lens, 804, is positioned at a first location at a distance of $d_1$, 808, above the film 812 on the wafer 814 where the film thickness is $t_1$, 810.

When the same lithographic process is to be applied to a second location where the film thickness is $t_2$, 816, at least two problems may arise to cause feature dimension variation or even yield loss. The first problem is whether the film thickness variation, $t_2-t_1$ is within the depth of focus (DOF), 806, of the lithographic process at a given wavelength. If the film thickness variation is beyond the DOF, the film may not obtain sufficient exposure and/or contrast, and the lithographic process may fail and cause yield loss. One embodiment of the invention adjusts the position of the lithographic apparatus and the mask to accommodate the topographical variation from die to die as show in the right hand portion of FIG. 8. However, for thickness variations within die, it may be impossible to adjust the stepper. However, normal semiconductor processing tools are not likely to produce such a large thickness variation within a single process step, especially in light of the fact that the depth of focus is nearly $2\lambda$ for a numerical aperture (NA) of 0.7. That is, where the numerical aperture is 0.7, the thickness must vary more than 0.4 µm to be outside the depth of focus for a 193 nm lithography tool. This is an unlikely result for a modern process tool, so outright failure may be unlikely. However, within this range, the exposure latitude falls off as the focus departs from the optimum value. To minimize this yield-decreasing effect, another embodiment takes the process models and the within-die thickness variation information and modifies the design to prevent such a large thickness variations from occurring or at least reduce the within-die thickness variations.

Even if the thickness variation is within the DOF of the lithographic process, the reduction lens, 804, is now located at a distance of $d_2$, 818, which is shorter than $d_1$, 808, by the thickness differential, $t_2-t_1$. As a result, a different area on the film at the second location will be exposed to the light at a different intensity unless the position of the lithographic process and the mask are adjusted to compensate for the topographical variation. Another embodiment of the invention, without moving the lithographic apparatus and the mask, takes the lithographic model together with the topographical variation into consideration, analyzes the impact of the lithographic process and topographical variation, and determines their impact on the feature dimensions as well as electrical or dielectric properties of the features.

Figure 9:
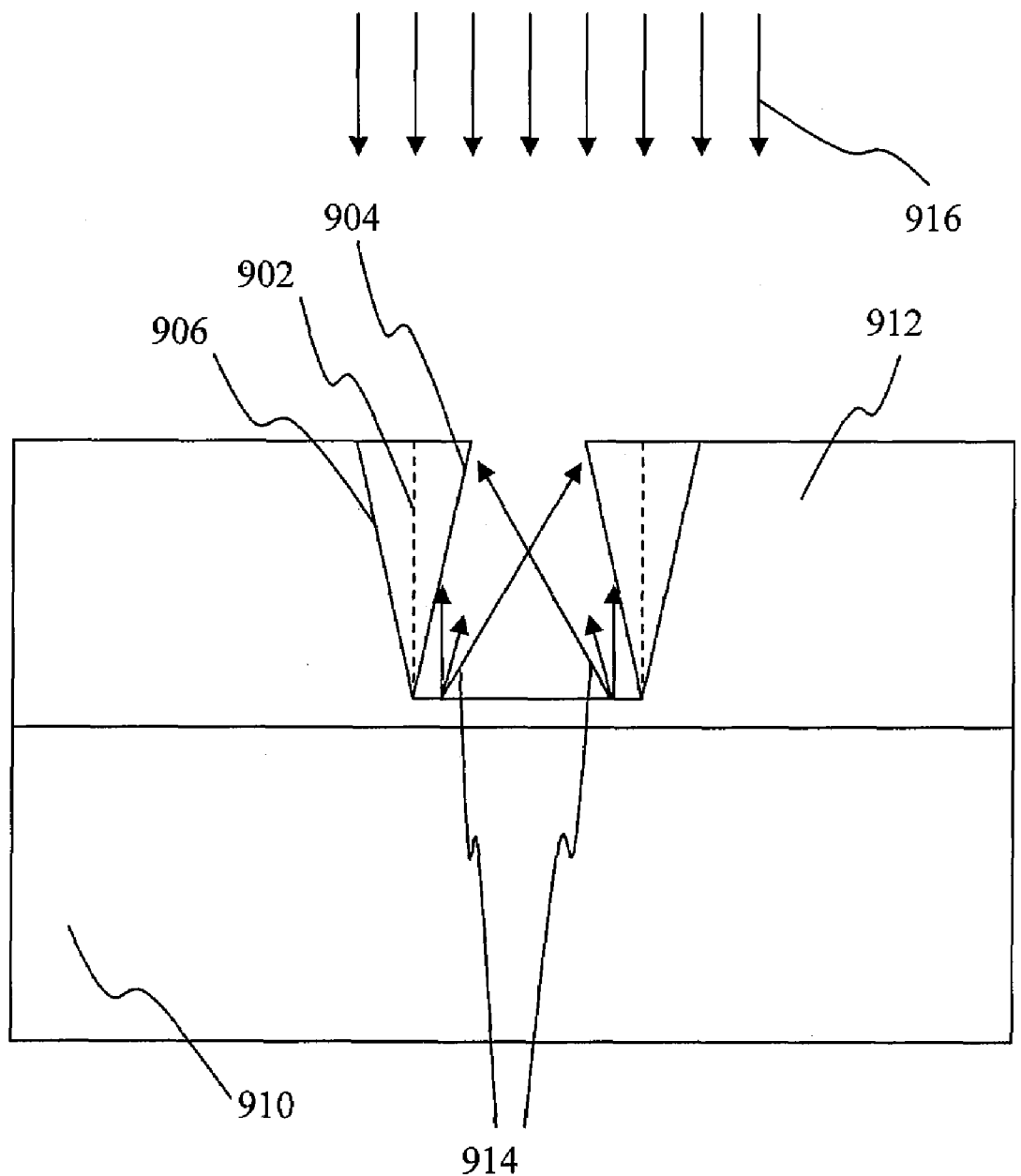
FIG. 9 illustrates an example of the process-induced impact on the cross-section of an electronic design feature of an electronic design.

FIG. 9 illustrates an example of the impact of a concurrent model on a feature profile and dimensions. In FIG. 9, the film, 912, on top of a wafer, 910, is subject to a fabrication process, 916. Such integrated circuit fabrication processes or techniques may comprise, for example but not limited to, deposition processes such as physical vapor deposition (PVD), chemical vapor deposition (CVD), atomic layer deposition (ALD), electrochemical deposition or electroplating (ECD), electroless plating or deposition, auto-catalytic plating or deposition, and molecular beam epitaxy (MBE), removal processes such as isotropic or anisotropic wet or dry etching, chemical mechanical polishing (CMP), or reflow processes, patterning processes such as lithography, modification of properties such as ion implantation, annealing, oxidation, UVP (ultraviolet light processing). More specifically, lithography processes or techniques comprise microlithography, nanolithography, photolithography, electron beam lithography, maskless lithography, nanoimprint lithography, interference lithography, x-ray lithography, extreme ultraviolet lithography, or scanning probe lithography, or the plasma ashing processes.

In some embodiments of the present invention where the fabrication process is a deposition process, the designer may intend to create a desired profile of a feature, 902. However, redeposition and/or resputtering, 914, may occur from the bottom and side walls of the feature and actually cause the width of the feature to shrink to a first trapezoidal profile, 904. Such a trapezoidal profile of the feature may impact various properties of the feature of the electronic circuit in various manners due to the departure of various features from their nominal or intended profiles and the resulting changes in the physical, chemical, and/or electrical properties. For example, a change in the cross-sectional profile of a feature may change the electrical resistance and capacitance of a conductor and thus may change the timing characteristics of the electronic circuit.

Some embodiments of the present invention may determine the approximate profiles of the wires based upon the input information of the process conditions or parameters. The process conditions or parameters may comprise specific information of the processing equipment or processing recipe such as, but not limited to, such as the bias potential, plasma densities and distribution, vacuum level of the processing chamber, power supply to sustain the plasma, wafer pedestal temperature distribution, other information such as the design layout, and information about the manufacturing-specific variations of fabrication processes. Yet some other embodiments capture some or all of the input information by directly simulating the processes or techniques. Yet some other embodiments capture some or all of the input information by measuring the results on a test patterned wafer against certain metrics. Yet some other embodiments obtain the wire profiles by integrating, for each point along the cross-section of each of the wire profiles, a probability distribution function for the sputtering of materials, e.g., a cosine distribution function for any sputtering point source, along the entire path of the profile and then analyze or calculate the accumulation of the sputtered materials at other points along the same cross-section of the wire profile. Yet some other embodiments analyze and calculate the approximate feature profiles by simulating the fabrication processes (such as isotropic or anisotropic etching processes) together with the information of the electronic circuit design and the fabrication processes.

In some other embodiments where the fabrication process, 916, constitutes an etching process such as an anisotropic or an isotropic etching process, the upper portion of the side walls is subject to different characteristics of the process such as different bias potential or a different plasma density and thus may exhibit a faster etch rate to form a second trapezoidal profile, 906. Thus, etch may have different widths at the top and bottom of the etched feature due to sidewall angle and have different etched depths that depend upon interaction between specific layout pattern geometries and the etch process. Such a trapezoidal profile of the feature may also impact various properties of the feature of the electronic circuit in various manners due to the departure of various features from their nominal or intended profiles and the resulting changes in the physical, chemical, and/or electrical properties.

Yet some other embodiments further analyze the impact of these process, metrology, or imaging processing models on the film, 912. Some other embodiments take these analysis results and forward them onto the next fabrication layer. The method or the system of some embodiments of the present invention on the next fabrication or interconnect level incorporates these profiles and/or variations in feature dimensions or profiles of the features on a underlying level or layer to determine the corresponding variations in electrical properties or profiles or dimensions of features of the electronic circuit on the next layer or level. Such electrical properties may include but are not limited to bulk resistivity, bulk resistance, wire capacitance, power consumption and may be further incorporated in the design tool to determine whether some of the nets constitute critical nets and whether the design meets the design objectives such as the timing goals in yet some other embodiments.

Some embodiments translate the information about the process models and/or the design elements into a separate set of requirements without unnecessarily disclosing such one or more models for the fabrication, metrology, lithography, and/or imaging processing and/or the design elements to third parties. These methods are particularly useful in protecting the ownership of intellectual property and rights therein. For example, the semiconductor Fabs may not wish to disclose such information to IC design houses; the processing equipment manufacturers may not wish to disclose the true capabilities of their processing equipment to other parties; and IP core owners may wish to grant only the right to use without disclosing the details of such IP cores to the licensees or users.

Some other embodiments further obtain the information about the fabricated features of the design and use such information to further calibrate the process models as well as the modifications to the design itself or the fabrication processes so as to improve the accuracy and effectiveness of the methods or systems described above.

Some other embodiments may use hierarchical models that trade-off computational speed and prediction accuracy. An application of this may involve using faster, less accurate models to examine large portions of a given design and slower more accurate models in smaller regions that become a concern.

Yet some other embodiments further utilize systems utilizing parallel computing architecture to achieve the purpose. Some other embodiments also store the three-dimensional wire/feature profile in a data structure or a database for subsequent retrieval as well as use.

System Architecture Overview

Figure 10:
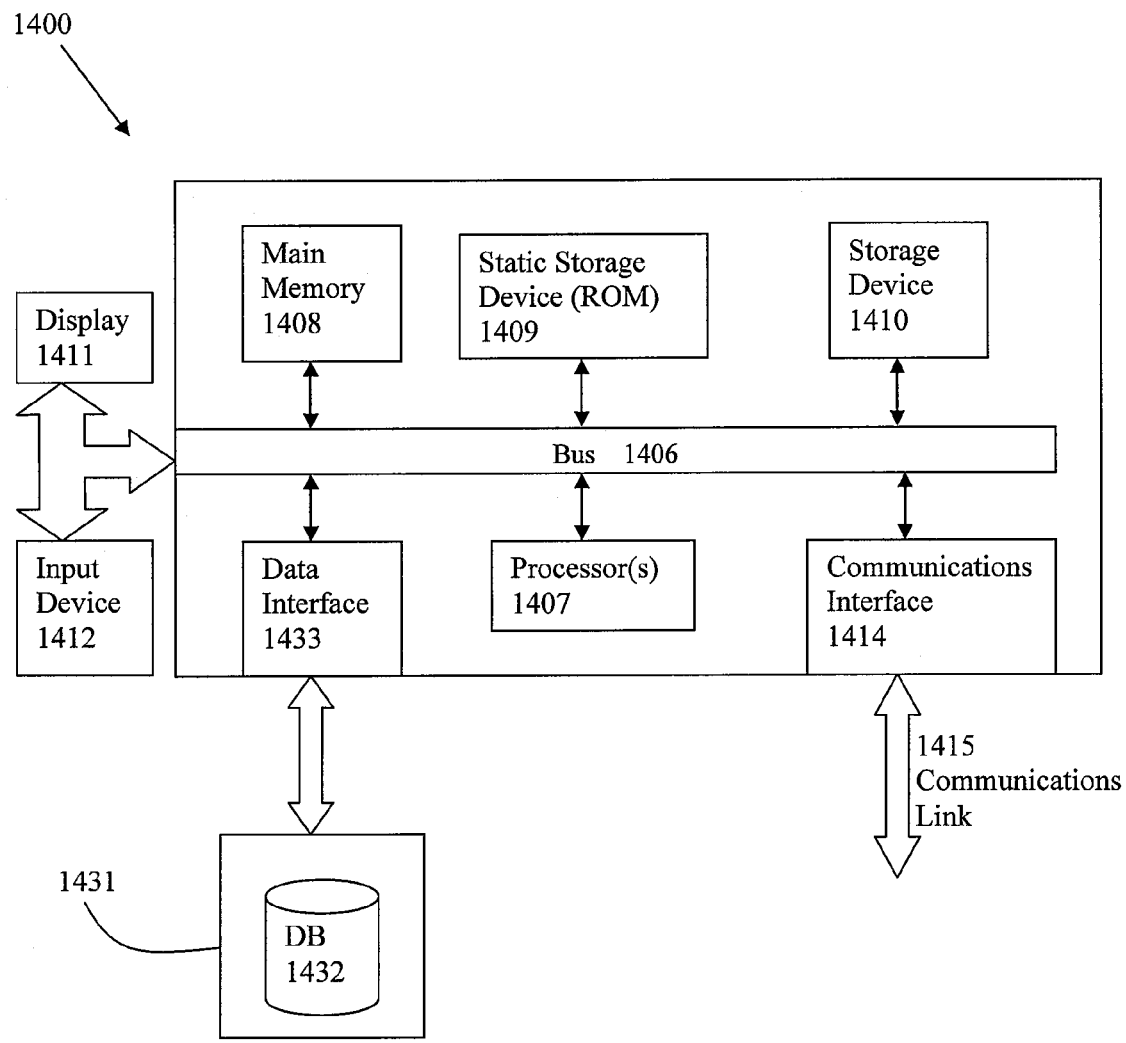
FIG. 10 depicts a computerized system on which a method for performing timing closure for electronic design with concurrent models can be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may also interact with a database system 1432 via a data interface 1433 where the computer system 1400 may store and retrieve information or data of the electronic design into and from the database system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A machine-implemented method for performing closure for an electronic circuit design of an electronic circuit, comprising:

identifying the electronic circuit design for an electronic circuit to be manufactured by a first manufacturing process;

identifying a first concurrent model for the first manufacturing process for a first level of the electronic circuit;

determining a first metric of the first level based at least in part upon a first geometric characteristic of a first feature determined by the first concurrent model, wherein the first feature comprises a circuit component of the electronic circuit;

determining whether a first closure requirement for the first level is satisfied based at least in part upon the first geometric characteristic or the first metric, wherein the act of determining the first metric or the act of determining whether the first closure requirement for the first level is satisfied is performed by a processor;

preventing a variation of the first geometric characteristic from propagating to a second level of the electronic circuit by reducing one or more violations of the closure requirement on the first level, wherein the violations of the closure requirement on the first level are caused at least in part by the variation; and displaying the first geometric characteristic of the first level on a display apparatus or storing the first geometric characteristic in a tangible machine accessible medium or a storage device.

2. The machine-implemented method of claim 1, further comprising:

calibrating the first concurrent model with information obtained from a patterned test wafer or from a source with limited fidelity.

3. The machine-implemented method of claim 1, in which the first manufacturing process comprises a fabrication process, a metrology process, or an image processing process.

4. The fabrication process of claim 3 comprises physical vapor deposition process (PVD), chemical vapor deposition process (CVD), atomic layer deposition process (ALD), electrochemical deposition process (ECD), electro-plating process, molecular beam epitaxy process (MBE), isotropic or anisotropic wet or dry etching process, chemical mechanical polishing process (CMP), reflow process, ion implantation, annealing, oxidation, ultraviolet light processing process, microlithography, nanolithography, photolithography, electron beam lithography, maskless lithography, nanoimprint lithography, interference lithography, x-ray lithography, extreme ultraviolet lithography, scanning probe lithography, or plasma ashing process.

5. The metrology process of claim 3 comprises transmission electron microscopy (TEM), scanning electron microscopy (SEM), transmission electron aberration-corrected microscopy, energy filtered TEM, or an optical measurement technique.

6. The image processing process of claim 3 comprises a resolution enhancement technique (RET).

7. The machine-implemented method of claim 1, in which the first geometric characteristic comprises a cross-sectional profile of the first feature.

8. The machine-implemented method of claim 1, in which the first metric comprises an electrical, physical, thermal, or chemical characteristic of the first level.

9. The machine-implemented method of claim 7, further comprising:

determining a second geometric characteristic of the first feature, wherein the first feature comprises a thickness in a thickness direction of a semiconductor substrate on which the first feature is to be manufactured, a length in one or more directions perpendicular to the thickness direction, and a width direction perpendicular to the thickness direction and the length direction, and the first geometric characteristic is in the thickness direction, and the second geometric characteristic is in the length direction; and determining a second metric of the first level or updating the first metric of the first level based at least upon the profile and the second geometric characteristic of the first feature; and determining whether a second closure requirement is satisfied based at least in part upon the second geometric characteristic or the second metric.

10. The machine-implemented method of claim 1, further comprising:

identifying a second concurrent model of a second manufacturing process for the second level of the electronic circuit;

forwarding the first metric or the first geometric characteristic to the second concurrent model;

determining a second geometric characteristic of a second feature of the second level based upon the second concurrent model and the first geometric characteristic or the first metric; and determining a second metric of the second level based upon the second geometric characteristic.

11. The machine-implemented method of claim 10, in which the second concurrent model is identical to the first concurrent model.

12. The machine-implemented method of claim 10, in which the second manufacturing process for the second level is substantially similar to the first manufacturing process.

13. The machine-implemented method of claim 1, the second level being substantially similar to the first level.

14. The machine-implemented method of claim 1, the first concurrent model being constructed by directly simulating the first manufacturing process or being based at least in part upon one or more design rules.

15. The machine-implemented method of claim 9, further comprising:

adjusting one or more closure requirements in a portion of the electronic circuit based at least in part upon the second characteristic.

16. The machine-implemented method of claim 15, further comprising:

identifying a goal for a portion of the electronic circuit; and adjusting the one or more closure requirements based further at least in part on the goal.

17. The machine-implemented method of claim 1, in which a portion of the electronic circuit design is generated by a context simulation method.

18. The machine-implemented method of claim 1, further comprising:

combining the first concurrent model with statistical variability measured from or produced by an additional model for the first level to produce a distribution of values related to the first geometric characteristic.

19. A system for performing closure for an electronic circuit of an electronic circuit, comprising:
- means for identifying the electronic circuit design for an electronic circuit to be manufactured by a first manufacturing process;
- means for identifying a first concurrent model for the first manufacturing process for a first level of the electronic circuit;
- means for determining a first metric of the first level based at least in part upon a first geometric characteristic of a first feature determined by the first concurrent model, wherein the first feature comprises a circuit component of the electronic circuit;
- means for determining whether a first closure requirement for the first level is satisfied based at least in part upon the first geometric characteristic or the first metric, wherein the means for determining the first metric or the means for determining whether the first closure requirement for the first level is satisfied comprises a processor;
- means for preventing a variation of the first geometric characteristic from propagating to a second level of the electronic circuit by reducing one or more violations of the closure requirement on the first level, wherein the violations of the closure requirement on the first level are caused at least in part by the variation; and
- a display apparatus configured for displaying the first characteristic of the first level or a tangible computer accessible medium or a storage device configured for storing the characteristic.

20. The system of claim 19, further comprising:
- means for determining whether there is a second level of the electronic circuit.

21. The system of claim 20, wherein the second level is determined to exist, further comprising:
- means for identifying a second concurrent model of a second manufacturing process for the second level of the electronic circuit;
- means for forwarding the first metric or the first geometric characteristic to the second concurrent model;
- means for determining a second geometric characteristic of a second feature of the second level based upon the second concurrent model and the first geometric characteristic or the first metric; and
- means for determining a second metric of the second level based upon the second geometric characteristic.

22. The system of claim 21, further comprising:
- means for determining whether a second closure requirement for the electronic circuit is satisfied based upon the second geometric characteristic and the first geometric characteristic.

23. A computer program product comprising a computer-usable storage medium having executable code which, when executed by a processor, causes the processor to execute a process for performing closure for an electronic circuit design of an electronic circuit, the process comprising:
- identifying the electronic circuit design for an electronic circuit to be manufactured by a plurality of manufacturing processes;
- identifying a first concurrent model of a first manufacturing process for a first level of the electronic circuit;
- determining a first metric of the first level based at least in part upon a first geometric characteristic of a first feature of the first level determined by the first concurrent model, wherein the first feature comprises a circuit component of the electronic circuit;
- determining whether a first closure requirement for the first level is satisfied based at least in part upon the first geometric characteristic, wherein the act of determining the first metric or the act of determining whether the first closure requirement for the first level is satisfied is performed by a processor;
- preventing a variation of the first geometric characteristic from propagating to a second level of the electronic circuit by reducing one or more violations of the closure requirement on the first level, wherein the violations of the closure requirement on the first level are caused at least in part by the variation; and
- displaying the first characteristic of the first level on a display apparatus or storing the characteristic in a tangible computer accessible medium or a storage device.

24. The computer program product of claim 23, the process further comprising:
- determining whether there is a second level of the electronic circuit.

25. The computer program product of claim 23 wherein the second level is determined to exist, the process further comprising:
- identifying a second concurrent model of a second manufacturing process for the second level of the electronic circuit;
- forwarding the first characteristic or the first geometric characteristic to the second concurrent model;
- determining a second geometric characteristic of a second feature of the second level based upon the second concurrent model and the first geometric characteristic or the first metric; and
- determining a second metric of the second level based upon the second geometric characteristic.

\* \* \* \* \*